United States Patent [19]

Medem et al.

[11] 3,855,116

[45] Dec. 17, 1974

[54] METHOD FOR SEPARATION OF EMULSION PREPARED IN MICROBIOLOGICAL DEWAXING OF PETROLEUM FRACTIONS HAVING DISTILLATION RANGE FROM 230 TO 450

[76] Inventors: Vulf Matveevich Medem, Prospekt Lenina 67, Kv. 54; Sergei Andreevich Boldrev, Ulitsa Lesnaya, 23, Kv. 1, both of Orsk; Leonty Petrovich Karpenko, Ulitsa Televizionnaya, 2, Kv. 202; Rafik Tsaturovich Dolukhanov, Ulitsa Polyarnaya, 9, Korpus, Kv. 127, both of Moscow; Nikolai Sergeevich Sergeev, Prospekt Lenina 67, Kv. 54, Orsk, all of U.S.S.R.

[22] Filed: Mar. 23, 1972

[21] Appl. No.: 237,499

[52] U.S. Cl. .............................. 208/188, 195/3 H
[51] Int. Cl. ............................................ C10g 33/04
[58] Field of Search ................ 195/3 H, 3 R, 28 R; 208/28, 29, 188; 252/330

[56] References Cited
UNITED STATES PATENTS

| | | | |
|---|---|---|---|
| 2,566,980 | 9/1951 | Catanach et al. | 252/330 |
| 3,560,341 | 2/1972 | Champagnat et al. | 195/3 H |

OTHER PUBLICATIONS

Berkman, et al., Emulsions and Foams, pp. 285–293, Reinhold Publishing Corp., 1941, TP 156.E6 B45.

*Primary Examiner*—A. Louis Monacell
*Assistant Examiner*—R. B. Penland
*Attorney, Agent, or Firm*—Eric H. Waters

[57] ABSTRACT

A method for separation of an emulsion prepared in the process of microbiological dewaxing of petroleum fractions having the distillation range from 230° to 450°C which consists of a mineral aqueous medium, dewaxed product and yeast, consisting in that the emulsion is treated with a 2–5 per cent ammonia-soda solution having the ammonia to soda ratio (by weight) of 1–4 : 4–1. The consumption of the aqueous ammonia-soda solution is 15–50 kg per ton of the starting petroleum fractions. The emulsion is treated with the aqueous ammonia-soda solution at a temperature within the range from 60 to 100°C. After this treatment, the emulsion is separated by settling.

The proposed method for separation of emulsion is simple in practical embodiment, cheap and ensures effective separation of the emulsion into its component parts.

2 Claims, No Drawings

METHOD FOR SEPARATION OF EMULSION PREPARED IN MICROBIOLOGICAL DEWAXING OF PETROLEUM FRACTIONS HAVING DISTILLATION RANGE FROM 230 TO 450

The invention relates to the method for separation of an emulsion prepared in the process of microbiological dewaxing of petroleum fractions having the distillation range from 230° to 450°C, which consists of a mineral aqueous medium, the dewaxed product and yeast.

Methods are known in the prior art for separation of the such an emulsion by centrifuging (French Pat. No. 1,297,033), by filtration (French Pat. No. 1,334,466) or by separation (French Pat. No. 1,320,058).

Also known is another method for separation of the such an emulsion by treating it with an aqueous solution of quaternary ammonium salts with subsequent settling (Dymay Henry, Gas, Hal., 1961, 11, No. 4, 119).

The processes mentioned for separation of such an emulsion which is formed in microbiological dewaxing of petroleum fractions having the distillation range from 230° to 450°C are very complicated and expensive; moreover, they do not ensure adequate separation of the emulsion into component parts.

It is a primary object of this invention to provide a method that ensures the required separation of the emulsion into its component parts.

It is another object of the invention to provide a simple and inexpensive method for separation of the emulsion.

In accordance with these and other objects which will be apparent from the following description, the invention consists in treating the emulsion which is formed in the process of microbiological dewaxing of petroleum fractions boiling within the range of temperatures from 230° to 450°C and which consists of a mineral aqueous medium, the dewaxed product and yeast, with according to the invention, a 2–5 per cent, preferably with a 3 per cent aqueous ammonia-soda that is, sodium carbonate solution having an ammonia to soda ratio of 1–4 : 4–1 (w/w), preferably 4 : 1. The consumption of the ammonia soda solution is from 15 to 50 kg, preferably 30 kg per ton of the starting petroleum fractions. The emulsion is treated with the aqueous ammonia-soda solution at a temperature from 60 to 100°C, and preferably at a temperature of 85°C. After this treatment, the emulsion is allowed to stand for separation of the constituents.

After adding the aqueous ammonia-soda solution to the emulsion, its stability is markedy impaired, and on settling, it is separated into its component parts, namely into the mineral aqueous medium, the dewaxed product, and yeast.

The proposed method for separation of the emulsion is very simple in practical embodiment and as well it is inexpensive and ensures efficient separation of the emulsion into its component parts.

For a better understanding of the invention, the following examples of separation of the emulsion formed in microbiological dewaxing of the petroleum fractions having the distillation range from 234° to 540°C which consists of a mineral aqueous medium, dewaxed product and yeast, are given by way of illustration.

EXAMPLE 1.

A mineral aqueous medium containing 80 mg/litre of nitrogen, 45 mg/litre of phosphorus, 5 mg/litre of potassium, and 13 mg/litre of chlorine was fed into a dewaxing column having the capacity of 3,000 litres at a continuous rate of 200 litres/hour. Yeast culture grown in a fermentation tank was fed simultaneously into the same column at a rate of 2 litre/hour (the concentration of the yeast being 25–30 g/litre). A straight-run petroleum fraction having a distillation range from 230° to 360°C, a congelation point at −12°C and containing 15 per cent of waxes of normal structure was fed at a rate of 100 litres/hour into the same apparatus. The temperature inside a dewaxing column was maintained within the range from 28° to 35°C; the pH of the medium was 3–4.

The emulsion was discharged from the dewaxing column into a settling tank for preliminary separation at a continuous rate of 287 litres/hour; after settling for 2–2.5 hours the emulsion was partly separated from the mineral nutrient medium. The mineral aqueous medium was returned from the lower part of the settling tank into the dewaxing column at a rate of 140 litres/hour, whereas the supernatant emulsion was discharged through the top of the settling tank at a rate of 147 litres/hour and mixed with a 5 per cent aqueous solution of ammonia-soda solution (the ammonia to soda ratio being 4:1). The ammonia-soda solution consumption was 30 kg per ton of the starting petroleum fraction. The emulsion was mixed with the solution in a mixing tank having a working capacity of 350 litres. The temperature of mixing was 60°C. The contents of the mixing tank were continually discharged into a settling tank, where the reaction mixture was separated into three distinctly divided layers.

The supernatant layer was the dewaxed product. It was produced in amount of 84.3 litres/hour. The comparative characteristics of the dewaxed product and the starting petroleum fraction are given in Table 1.

Table 1

| Specification | Dewaxed product | Starting fraction |
| --- | --- | --- |
| 1 | 2 | 3 |
| Distillation range: | | |
| beginning of distillation,°C | 235 | 230 |
| 50 percent distills at, °C | 303 | 300 |
| end of distillation, °C | 365 | 360 |
| Density, g/cu.cm. | 0.882 | 0.824 |
| Acidity, in mg of KOH per 100 ml | 4.2 | 12 |
| Flash point, °C | 75 | 63 |
| Sulphur, percent by weight | 0.32 | 0.29 |
| Congelation point, °C | −65 | −12 |
| Moisture, percent by weight | 0.2 | nil |

The middle layer was a mineral aqueous medium produced in amount of 45 litres/hour and containing traces of the dewaxed product and yeast; the pH of the medium was around 9–10. The middle layer was used to adjust the pH at the dewaxing stage.

The lower layer was liquid yeast, produced in amount of 17.7 litres/hour. After drying and extraction, the specifications of the yeast were as follows (in per cent by weight):

| | |
| --- | --- |
| moisture | 7.5 |
| ash | 5.4 |
| total protein | 49.4 |
| residual hydrocarbons | 0.01 |

EXAMPLE 2.

Into a dewaxing apparatus having a working capacity of 3,000 litres there was delivered a mineral aqueous medium containing 80 mg/litre of nitrogen, 45 mg/litre of phosphorus, 5 mg/litre of potassium and 13 mg/litre of chlorine at a continuous rate of 200 litres/hr. Simultaneously, there was delivered also a yeast culture grown in a fermentation tank (yeast concentration, 25–30 g/litre; the feed rate was 2 litres/hour) and the straight-run petroleum fraction having a distillation range from 230° to 360°C, a congelation point at −12°C and containing 15 per cent of waxes of normal structure (fed at a rate of 100 litres per hour). The temperature inside the dewaxing apparatus was maintained at 30°–32°C and the pH at 3 – 3.5.

The emulsion was discharged from the dewaxing apparatus into a settling tank for preliminary separation at a rate of 287 litres/hour; after settling for 2–2.5 hours the emulsion was partly separated from the mineral nutrient medium. The mineral aqueous medium was returned from the lower part of the settling tank back into the dewaxing apparatus at a rate of 140 litres/hour, whereas the supernatant emulsion was discharged from the top of the settling tank at a rate of 147 litres/hour and mixed with a 3 per cent aqueous ammonia-soda solution (the ammonia to soda ratio being 4:1). The consumption of the ammonia-soda solution was 35 kg per ton of the starting petroleum fraction. The emulsion was mixed with the solution in a mixer of 300-litre working capacity at a temperature of 70°C. The mixer contents were continually delivered into a settling tank where the components were separated into three layers during 3.5 hours.

The supernatant layer was the dewaxed product, product in amount of 84 litres/hour. The comparative characteristics of the dewaxed product and the starting petroleum fraction are given in Table 2.

Table 2.

| Specifications | Dewaxed product | Starting fraction |
| --- | --- | --- |
| Distillation range: | | |
| beginning of distillation, °C | 235 | 230 |
| 50 per cent distills at, °C | 302 | 300 |
| end of distillation, °C | 366 | 360 |
| Density, g/cu.cm. | 0.880 | 0.824 |
| Acidity, in mg of KOH per 100 ml | 7.1 | 12.0 |
| Flash point, °C | 75 | 63.0 |
| Sulphur, percent by weight | 0.31 | 0.29 |
| Congelation point, °C | −65 | −12 |
| Moisture, percent by weight | 0.4 | nil |

The middle layer is a mineral aqueous medium obtained in amount of 45 litres/hour, containing traces of the dewaxed product and yeast, and having pH of 8–9. A part of the middle layer was used to adjust the pH at the dewaxing stage, whereas the remaining part was used for the preparation of the aqueous ammonia-soda solution.

The lower layer was liquid yeast produced in amount of 18 litres/hour. After drying and extraction, the specifications of the yeast were as follows (in per cent by weight):

| | |
| --- | --- |
| moisture | 7.5 |
| ash | 5.8 |
| total protein | 48.0 |
| residual hydrocarbons | 0.08 |

EXAMPLE 3

Into a dewaxing apparatus of 3,000-litre capacity there was continually fed at a rate of 100 litres/hour a mineral aqueous medium containing 80 mg/litre of nitrogen, 45 mg/litre of phosphorus, 5 mg/litre of potassium and 13 mg/litre of chlorine. Into the same apparatus there was simultaneously delivered yeast culture having concentration of 25–30 g/litre (at a rate of 2 litres/hour) and a straight-run fraction of petroleum having a distillation range from 300° to 410°C, a congelation point at 8°C and containing 8.5 per cent of waxes of normal structure (at a rate of 30 litres/hour). The temperature in the dewaxing apparatus was maintained at 28°–32°C; the pH 3 – 3.5.

From the dewaxing apparatus, the emulsion was discharged at a rate of 120 litres/hour into a settling tank, where it was settled for 1.5 – 2 hours to separate from the mineral culture medium. The mineral aqueous medium was continually withdrawn from the settling tank bottom at a rate of 60 litres/hr, whereas the supernatant emulsion was discharged from the tank top at a rate of 60 litres/hour and mixed with a 4 per cent aqueous ammonia-soda solution (the ammonia to soda ratio being 1:2). The consumption rate of the ammonia-soda solution was 20 kg per ton of the starting petroleum fraction. The emulsion was mixed with the solution in a mixing tank having a working capacity of 150 litres; the mixing temperature was 85°C.

The mixer contents were continually delivered into another settling tank where the mixture settled, separating out into three layers during 2.5 hours.

The supernatant layer was the dewaxed product obtained in amount of 27 litres/hour. The comparative characteristics of the dewaxed product and the starting petroleum fraction are given in Table 3.

Table 3

| Specification | Dewaxed product | Starting fraction |
| --- | --- | --- |
| Distillation range, | | |
| beginning of distillation, °C | 307 | 300 |
| 50 percent distills at, °C | 342 | 340 |
| 90 percent distills at, °C | 378 | 370 |
| end of distillation, °C | 415 | 410 |
| Density, g/cu.cm. | 0.9 | 0.88 |
| Acid number, in mg of KOH per 1 g | 0.28 | 0.25 |
| Flash point, °C | 175 | 172 |
| Sulphur, per cent by weight | 0.45 | 0.35 |
| Ash, percent by weight | 0.008 | 0.005 |
| Congelation point, °C | +8 | −34 |
| Moisture, percent by weight | 0.3 | nil |

The middle layer is a mineral aqueous medium which was produced in amount of 22 litres/hour and contained traces of the dewaxed product and yeast; the pH of the medium was 9–10.

A part of the middle layer was used in adjusting the pH at the dewaxing stage, whereas the remaining part was used in the preparation of the aqueous ammonia-soda solution.

The lower layer was liquid yeast, produced in amount of 11 litres/hour. After drying and extraction, the specifications of the yeast were as follows (in per cent by weight):

| | |
| --- | --- |
| moisture | 8.2 |

|               |      |
|---------------|------|
| ash           | 7.8  |
| total protein | 48.3 |
| residual hydrocarbons | 0.09 |

EXAMPLE 4.

Into a dewaxing apparatus having a working capacity of 3,000 litres, there was continually fed a mineral aqueous medium containing 80 mg/litre of nitrogen, 45 mg/litre of phosphorus, 5 mg/litre of potassium and 13 mg/litre of chlorine; the medium was delivered into the apparatus at a rate of 100 litres/hour. Simultaneously, into the same apparatus there was delivered yeast culture grown in a fermentation tank and having the concentration of 25–30 g/litre, and a straight-run petroleum fraction having a distillation range from 300° to 410°C, the congelation point at 8°C and containing 8.5 per cent of waxes of normal structure. The rates of delivery were 2 and 30 litres per hour respectively.

The emulsion was discharged continually at a rate of 120 litres per hour from the dewaxing apparatus into a settling tank where after settling for 1.5–2 hours the emulsion was separated from the mineral culture medium. The mineral aqueous medium was withdrawn from the bottom of the settling tank at a rate of 60 litres per hour and returned back into the dewaxing apparatus, whereas the supernatant emulsion was discharged from the top of the tank at a rate of 60 litres per hour and mixed with a 2.5 per cent aqueous ammonia-soda solution (the ammonia to soda ratio being 4:1). The consumption of the ammonia-soda solution was 40 kg per ton of the starting fraction. The emulsion was mixed with the ammonia-soda solution in a mixing tank having the working capacity of 150 litres; the mixing temperature was 90°C. The mixer contents were continuously discharged into a settling tank where the mixture was finally separated into three layers during 4.5 hours.

The upper layer was the dewaxed product, prepared in amount of 26.5 litres per hour. The comparative characteristics of the dewaxed product and the starting petroleum fraction are given in Table 4.

The middle layer was a mineral aqueous medium, produced in amount of 22 litres/hour, containing traces of the dewaxed product and yeast; the pH of the medium 8–9. A part of the middle layer was used for adjustment of the pH at the dewaxing stage, whereas the remaining part of this layer was used in the preparation of the aqueous ammonia-soda solution.

Table 4

| Specifications | Dewaxed product | Starting fraction |
|---|---|---|
| Distillation range: | | |
| beginning of distillation, °C | 306 | 300 |
| 50 percent distills at, °C | 343 | 340 |
| 90 percent distills at, °C | 377 | 370 |
| end of distillation, °C | 416 | 410 |
| Acid number, in mg of KOH per 1 g | 0.55 | 0.25 |
| Congelation point, °C | +8 | −34 |
| Sulphur, percent by weight | 0.45 | 0.35 |
| Ash, percent by weight | 0.005 | 0.005 |
| Moisture, percent by weight | 0.5 | nil |
| Flash point, °C | 176 | 172 |
| Density, g/cu.cm. | 0.900 | 0.88 |

The lower layer was liquid yeast prepared in amount of 11.5 litres per hour. After drying and extraction, the specifications of the yeast were as follows (in per cent by weight):

| | |
|---|---|
| moisture | 8.0 |
| ash | 5.5 |
| total protein | 48.6 |
| residual hydrocarbons | 0.07 |

Into a dewaxing apparatus having a working capacity of 3,000 litres there was continually delivered manual aqueous medium containing 80 mg/litre of nitrogen, 45 mg/litre of phosphorus, 5 mg/litre of potassium and 13 mg/litre of chlorine (at a rate of 100 litres per hour), yeast culture grown in a fermentation tank, containing yeast 25–30 g/litre (at a rate of 2 litres per hour) and a straight-run fraction of petroleum having a distillation range from 300° to 410°C, the congelation point at 8°C and containing 8.5 per cent of waxes of normal structure (at a rate of 30 litres per hour).

From the dewaxing apparatus, the emulsion was continually discharged at a rate of 120 litres per hour into a settling tank for preliminary separation. On standing for 1.5 – 2 hours, the emulsion was partly separated from the mineral culture medium. The mineral aqueous medium was discharged from the bottom of the settling tank at a constant rate of 60 litres per hour back into the dewaxing apparatus, whereas the supernatant emulsion was withdrawn from the top of the settling tank at a rate of 60 litres per hour to be mixed with a 4.5 per cent mineral aqueous ammonia-soda solution. The consumption rate of the ammonia-soda solution was 15 kg per ton of the starting petroleum fraction. The emulsion was mixed with the aqueous ammonia-soda solution in a mixer having a working capacity of 150 litres; the mixing temperature was 95°C. The mixer contents were continually withdrawn into a settling tank for final separation, where the mixture was separated into three layers during 2 hours.

The supernatant layer was the dewaxed product, produced in amount of 27 litres per hour. The comparative characteristics of the dewaxed product and the starting petroleum fraction are given in Table 5.

The middle layer was a mineral aqueous medium, produced in amount of 22 litres per hour, and containing traces of the dewaxed product and yeast; the pH of the medium, 9–10. A part of the middle layer was used to adjust the pH at the dewaxing stage, whereas the remaining part was used in preparation of the aqueous ammonia-soda solution.

The lower layer was liquid yeast, produced in amount of 11 litres per hour. After drying and extraction, the specifications of the yeast were as follows (in per cent by weight):

| | |
|---|---|
| moisture | 7.9 |
| ash | 9.2 |
| total protein | 47.8 |
| residual hydrocarbons | 0.09 |

Table 5

| Specifications | Dewaxed product | Starting fraction |
|---|---|---|
| Distillation range: | | |
| beginning of distillation, °C | 305 | 300 |
| 50 percent distills at, °C | 344 | 340 |
| 90 percent distills at, °C | 375 | 370 |
| end of distillation, °C | 417 | 410 |

Table 5-Continued

| Specifications | Dewaxed product | Starting fraction |
|---|---|---|
| Acid number, in mg of KOH per 1 g | 0.20 | 0.25 |
| Congelation point, °C | +8 | −35 |
| Sulphur, percent by weight | 0.43 | 0.35 |
| Ash, percent by weight | 0.01 | 0.005 |
| Moisture, percent by weight | 0.02 | nil |
| Flash point, °C | 175 | 172 |
| Density, g/cu.cm. | 0.91 | 0.88 |

EXAMPLE 6.

Into a dewaxing apparatus having working capacity of 3,000 litres, there was delivered at a constant rate a mineral aqueous medium containing 90 mg/litre of nitrogen, 45 mg/litre of phosphorus, 6 mg/litre of potassium and 13 mg/litre of chlorine (at a rate of 100 litres per hour), yeast culture grown in a fermentation tank (yeast concentration of 25–30 g/litre; the feed rate of 2 litres per hour) and a straight-run petroleum fraction, having a distillation range from 290° to 450°C, a congelation point at 11°C and containing 9.3 per cent of waxes of normal structure (at a rate of 30 litres per hour). The temperature inside the dewaxing apparatus was maintained at 28°–32°C; the pH of the medium was 3–3.5.

From the dewaxing apparatus, the emulsion was continually discharged at a rate of 120 litres per hour into a settling tank for preliminary separation. On standing for 1.5 – 2 hours the emulsion was separated partly from the mineral nutrient medium. Through the bottom of the settling tank the mineral aqueous medium was withdrawn back into the dewaxing apparatus at a rate of 60 litres per hour, whereas the supernatant emulsion was withdrawn from the top of the settling tank at a rate of 60 litres per hour a mixed with a 2 per cent aqueous ammonia-soda solution (the ammonia to soda ratio being 3:4). The consumption of the aqueous ammonia-soda solution was 50 kg per ton of the starting petroleum fraction. The emulsion was mixed with the solution in a mixing tank having a working capacity of 150 litres; the mixing temperature was 100°C. The mixer contents were continually discharged into a settling tank for final separation. On standing for two hours, the mixture separated into three layers.

The upper layer was the dewaxed product, produced in amount of 26 litres per hour. The comparative characteristics of the dewaxed product and the starting petroleum fraction are given in Table 6.

The middle layer was a mineral aqueous medium obtained in amount of 23 litres per hour, containing traces of the dewaxed product and yeast; the pH of the medium was 9–10. A part of the middle layer was used to adjust the pH at the dewaxing stage, whereas the remaining part was used in the preparation of the aqueous ammonia-soda solution.

The lower layer was liquid yeast, produced in amount of 11 litres per hour. After drying and extraction, the specifications of the yeast were as follows (in per cent by weight):

| | |
|---|---|
| moisture | 7.9 |
| ash | 7.4 |
| total proteins | 48.5 |
| residual hydrocarbons | 0.1 |

Table 6

| Specifications | Dewaxed product | Starting fraction |
|---|---|---|
| Distillation range: | | |
| beginning of distillation, °C | 298 | 290 |
| 50 percent distills at, °C | 359 | 352 |
| 90 percent distills at, °C | 408 | 403 |
| end of distillation, °C | 452 | 450 |
| Acid number, in mg of KOH per 1 g | 0.27 | 0.32 |
| Congelation point, °C | −32 | +11 |
| Sulphur, percent by weight | 0.46 | 0.42 |
| Ash, percent by weight | 0.007 | 0.005 |
| Moisture, perccent by weight | 0.04 | nil |
| Flash point, °C | 180 | 174 |
| Density, g/cu.cm. | 0.9 | 0.92 |

We claim:

1. A method for separation of an emulsion prepared in the microbiological dewaxing of petroleum fractions having a distillation range from 230° to 450°C. and which emulsion contains a mineral aqueous medium, dewaxed product and yeast, consisting of mixing said emulsion with a 2–5 per cent aqueous ammonia-soda solution having an ammonia-soda ratio by weight of 1 to 4:4 to 1 at a temperature of from 60°C. to 100°C. consuming said solution in an amount in a range of 15 through 50 kg per ton of the starting petroleum fractions while impairing the stability of said emulsion and allowing the mixture to settle into separate layers.

2. A method for separation of an emulsion prepared in the microbiological dewaxing of petroleum fractions having a distillation range from 230° to 450°C. and which emulsion contains a mineral aqueous medium, dewaxed product and yeast, consisting of mixing said emulsion with a 3 percent aqueous ammonia-soda solution having an ammonia-soda ratio by weight of 4:1 at a temperature of 85°C., consuming said solution in an amount of 30 kg per ton of the said starting petroleum fractions while impairing the stability of said emulsion and allowing the mixture to settle into separate layers.

* * * * *